United States Patent [19]

Williams et al.

[11] 4,390,982

[45] Jun. 28, 1983

[54] DIGITAL PBX SYSTEM

[75] Inventors: William H. Williams, Arlington, Tex.; Michael G. Burke, Corinth, Miss.

[73] Assignee: International Telephone and Telegraph Corporation, New York, N.Y.

[21] Appl. No.: 225,020

[22] Filed: Jan. 14, 1981

[51] Int. Cl.³ ............................ H04J 3/00; H04J 6/00
[52] U.S. Cl. .................................. 370/67; 179/18 AD
[58] Field of Search ............................ 370/67, 62, 85; 179/18 AD, 18 ES

[56] References Cited

U.S. PATENT DOCUMENTS 4,061,880 12/1977 Collins et al. .......................... 370/67
4,288,870 9/1981 McDonald et al. ................... 370/67

Primary Examiner—Thomas A. Robinson
Attorney, Agent, or Firm—James B. Raden; Marvin M. Chaban

[57] ABSTRACT

A small capacity digital PBX-key system which uses a single processor to control the system. Since only a single processor is employed, the system is interrupt controlled. In the system, there is a codec per line, the codecs each having sufficient programmability to eliminate the need for time slot interchangers. To provide as many as 64 (or more) channels usable for speech, tones and conferencing, two (or more) parallel, 32 channel busses are used as the group bus. The stations and trunks (ports) of the system have access to both busses through the codecs. Information is routed to one or another bus through the transmission of bus control bits from the processor.

6 Claims, 6 Drawing Figures

DIGITAL PBX SYSTEM

BACKGROUND OF THE INVENTION

The present invention comprises a small capacity, single-processor version of the digital PBX—key system shown by U.S. patent application No. 135,464 filed on Mar. 31, 1980 by F. Ahmed and a second application, now U.S. Pat. No. 4,339,633 issued July 13, 1982 to F. Ahmed.

The system shown by the cited applications is a modular system comprised of plural groups of stations and trunks, with each group having a group processor, the group processors all having access to a central processor. Information between group processors and the central processor is routed by way of a memory in the group processors which stores messages until the receiving processor signals that it is ready to receive the stored information. By this approach, the need for interrupts is minimized.

In the system shown by the cited applications, all information within the system is routed over a systems bus with a further bus provided to transfer information between the processor and its memory, timers and decoders, this latter memory being called a nucleus bus.

Each station has four conductors extending between the station and an interface circuit performing the known supervisory functions of a line circuit. Of the four, two conductors are speech or data conductors and two are control conductors. The speech conductors receive speech and dialing information in analog form from the station and feed the analog data to inputs of a codec associated with the interface for that station. In the codec, the analog speech is translated into a PCM code and sent out on the group bus during a time slot. Naturally, the codec translates PCM code data to analog speech signals for transmission to its station.

The control conductors receive and transmit data in asynchronous digital form to stations of the type shown by U.S. Pat. No. 4,315,110 issued Feb. 9, 1982 to T. M. Davis. The control data is received in the station interface circuit to provide status information concerning the station condition.

SUMMARY OF THE INVENTION

The present invention is directed to a small capacity, single processor system using many of the principles disclosed in the previously mentioned applications. The present invention uses a single processor to control as many as forty-six ports or input/output terminal members.

To provide communication paths between these ports, the system has two parallel, thirty two channel busses. Of the available channels, a number are allocated to supervisory tones, and common service features; others are allocatable for conference purposes or for normal calls while still other channels are usable only for normal calls. All sixty-four channels are accessible to the ports by a dual, parallel bus arrangement. If further channels become necessary, added parallel busses can be provided with selection of the proper bus being performed by the processor through the use of the necessary number of bus selection bits.

The system as disclosed uses a commercially available codec for its digital to analog (D/A) and analog to digital (A/D) coding. The codec used has sufficient programmability to eliminate the need for time slot interchangers for the time slots of a bus.

It is therefore an object of the invention to provide an improved small capacity, digital, PBX-key system.

It is a further object of the invention to provide a digital telecommunications system having a plurality of parallel multiple channel busses to which each of the ports of the system have access.

It is a further object to the invention to provide a small capacity digital PBX-key system in which the basic number of channels "n" (where "n=24 or 32") may be expanded to nm channels where m may be any integer, by providing m separate busses of n channels. In the instance where m=8, selection of a bus is made by eight bit word controlled by the system processor with the time slot of a bus being selected and maintained within the memory of a codec individual to a port accessing the particular channel.

DETAILED DESCRIPTION OF THE DRAWINGS

The present system is a smaller version of the communications system generally of the type shown by U.S. patent application No. 135,464 filed Mar. 31, 1980 by F. Ahmed and by U.S. patent application, now U.S. Pat. No. 4,339,633 issued July 13, 1982 to F. Ahmed.

Figure 1:
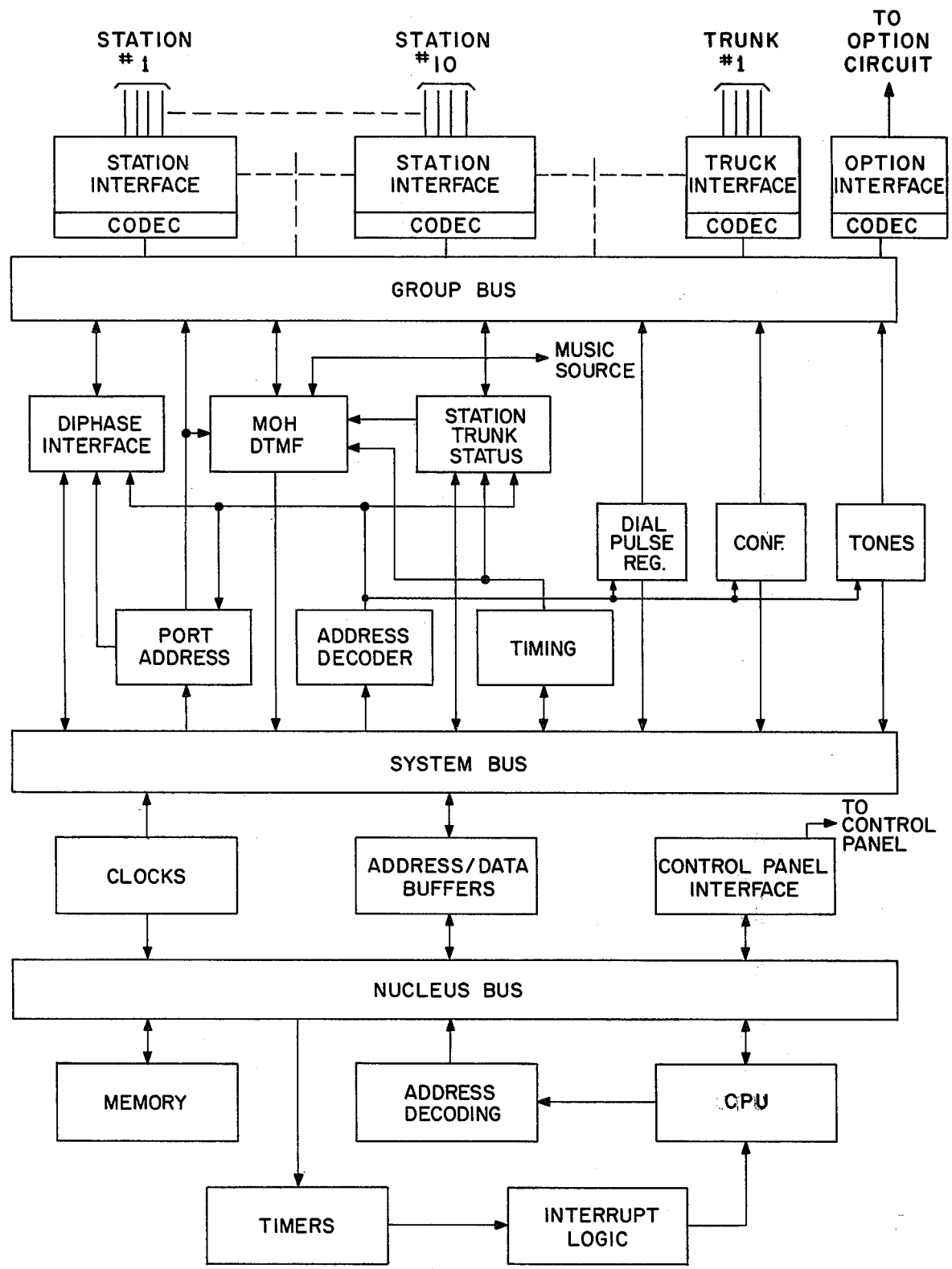
FIG. 1 is a schematic block diagram of the hardware of a PBX-key system using our invention.
Figure 5:
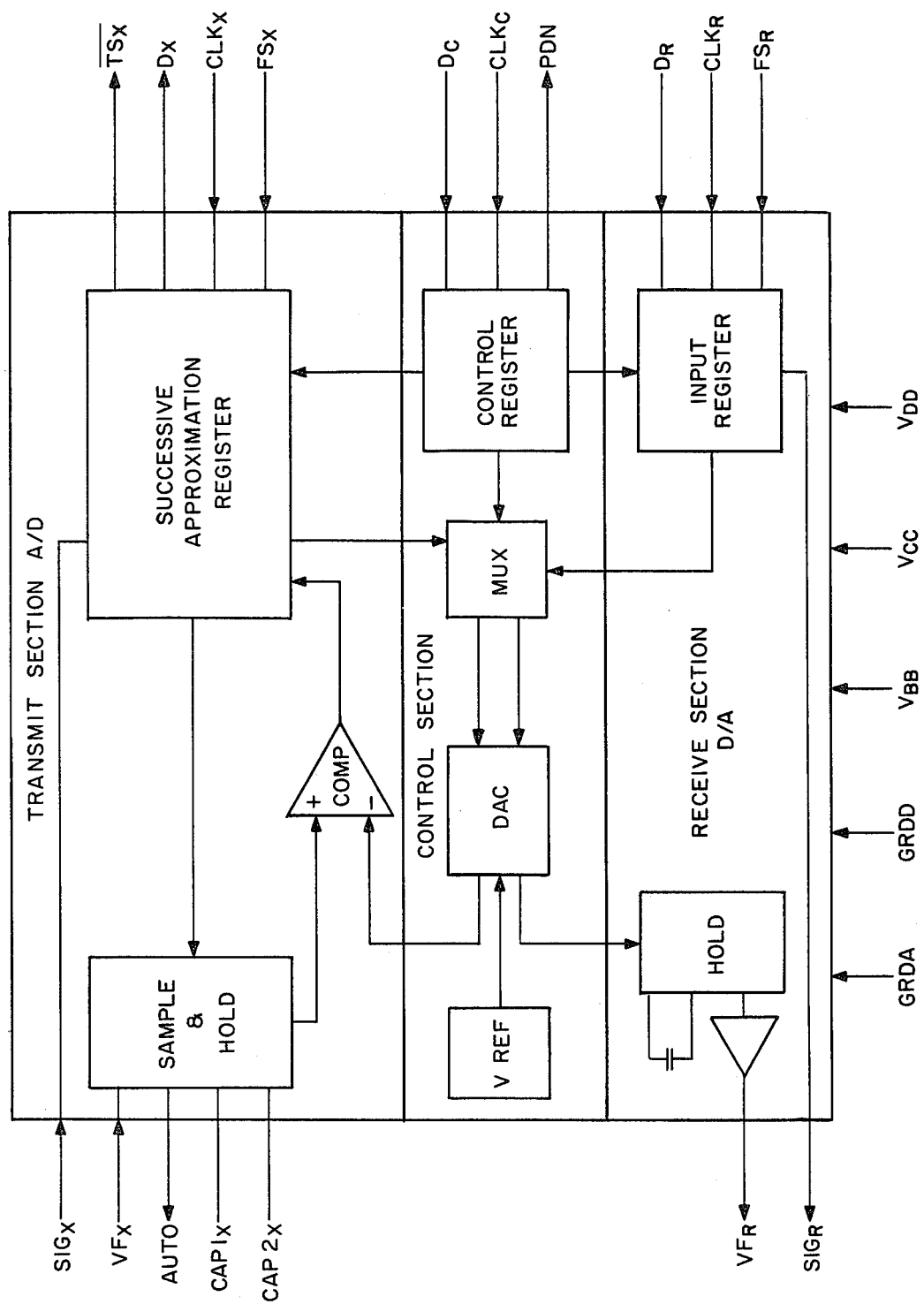
FIG. 5 is a block diagram of a codec usable in the block diagram of FIG. 1.

In FIG. 1, we show a block diagram of our system with the ports of the system-station, trunk or option-having access to the system through the Group Bus. The function of this bus is performed by a flat multiple conductor cable with plug-in connections at its ends, and having at least 18 conductors. The system may in one small configuration have 20 ports and in a larger, two group configuration up to 46 ports, of which usually the greater number of ports would be subscriber stations. Each such station would preferably be equipped with a telephone instrument of the type shown in U.S. patent application, now U.S. Pat. No. 4,315,110, issued Feb. 9, 1982 to J. Davis. The station instrument has four conductors, two for status or condition signaling into the system, and two conductors for destination signaling and speech. The condition signaling conductors transmit asynchronous bidirectional eight bit code data between the station and processor, while the speech conductors provide analog signals to the station interface for conversion to digital code within the codec associated with the interface. For each port such as a station, trunk or option circuit, there is an interface including a codec. A suitable codec for use herein is that sold by the Intel Corp. under the part number 2910A, a block diagram of which is shown in FIG. 5, herein. The codec provides time slot assignment on the group bus for the port. Intercommunication between ports is accomplished through time slots on the group bus as controlled by the CPU or system processor.

Figure 6:
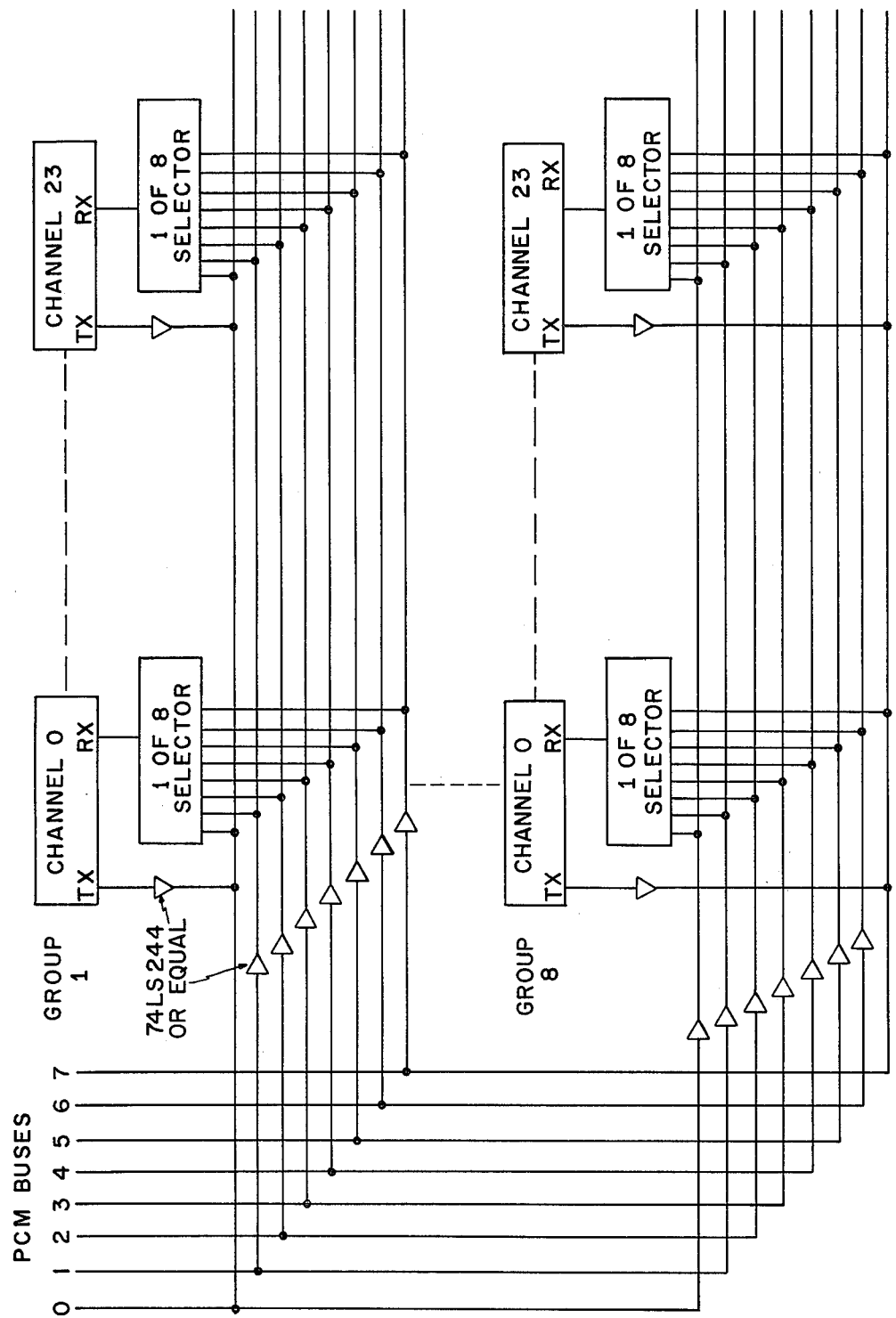
FIG. 6 is a generalized schematic diagram similar to FIG. 3 of an expanded version of a system using our invention.

The CPU for the system may be an 8085, 8 bit processor as manufactured and sold by Intel Corp. a block diagram of which is shown in FIG. 6. As described in the earlier mentioned references, intercommunication between the processor and its memory, logic and decoding is accomplished over a dedicated bus called the Nucleus Bus. The function of this bus is performed by internal wiring as required. Intercommunication between the processor and the system is accomplished through the Address/Data Buffers, and clocks using the System Bus. The function of the System bus is performed by a flat conductor multiple cable with plug in connections, the cable having at least 36 conductors. The processor selects the device to which it is sending data or receiving data from the address inserted in the address buffers. The device then receives or sends the data through the data buffers.

The memory used in this system is divided into three types, program, data and power fail. A "Memory Mapped" I/O is used. Thus, the only difference between memory (any of the three types) and actual I/O is a different address value.

Program memory is non-volatile and holds the program which the microprocessor will execute. A variety of memory sizes and device types are possible for the program memory. Erasable Programmable Read Only Memory (EPROM) or mask programmable Read Only Memory (ROM) can be used and the devices may be 16K, 32K or 64K bit in size.

Data Memory is composed of static Random Access Memory (RAM). If power is removed, data is lost; thus, it is volatile memory. The memory chips used are 4K bits organized as 1K by 4. A power fail feature is provided by a block of memory which holds real-time status of the system (timeslot assignments, auto-call back, hold, recall timers, etc.). It is loaded by the control panel which is an accessory attached with a cable. This memory is a non-volatile memory using Electrically Alterable Read Only Memory (EAROM), storing only a copy of the data base as a back up.

Between the Group Bus and the System Bus are a number of circuits used to analyze station or trunk status and to provide indications of these conditions coded suitably for the processor. In addition, certain circuits such as conference, tone generator and dial pulse register perform the respective functions of controlling a plurality of conferences in PCM form between ports, providing supervisory tones to the ports and registering dial pulses in either interrupted dial form or in dual tone multifrequency (DTMF) form.

These blocks shown in FIG. 1 are interacting between the group bus and system bus are:
  (a) The Port Address block which decodes the address of a device in response to a request by the CPU.
  (b) Diphase Interface block which provides the serial to parallel and parallel to serial conversion between the system bus and the diphase bus (contained in the group bus). This circuit also provides encoding/decoding between binary and diphase format. The station status signals such as type of subset and hookswitch condition are passed through this block.
  (c) Trunk/Station Status block provides an indication of the state of the stations or trunks, in addition to providing output dialing information and other needed signals.
  (d) Dial Pulse or DTMF Registers-The dial pulse (D.P.) register reads the loop current status from the station interface cards. To perform this function a digits counted by digital counter and mondstable multivibrator detect interpulse timeout. The DTMF register requires the receive half of a PCM chip set fed into an analog DTMF register. The analog DTMF register consists of a high and low group band pass filter, limiters, receiver and external components.
  (e) Tone Block includes a ROM containing a digital representation of the tones to be heard over the voice path. Additional circuitry serializes this data and feeds it onto the PCM bus.
  (f) Conference Circuits provide conference circuit capable of being divided into 4-3 way and 1-4 way conference. If a conference circuit is not available, a busy tone will be heard by the requesting party.
  (g) MOH (Music On Hold)/Paging Circuit uses the same type of PCM chip set as in the station circuit with a special circuit on the receive side for MOH and on the transmit side for paging. The MOH accepts one music source. The paging circuit may transmit to four zones. One zone or combinations of zones may be accessed at one time.
  (h) The Address Decoder blocks are used to break memory and Input/Output into convenient blocks for addressing purposes.

Figure 2:
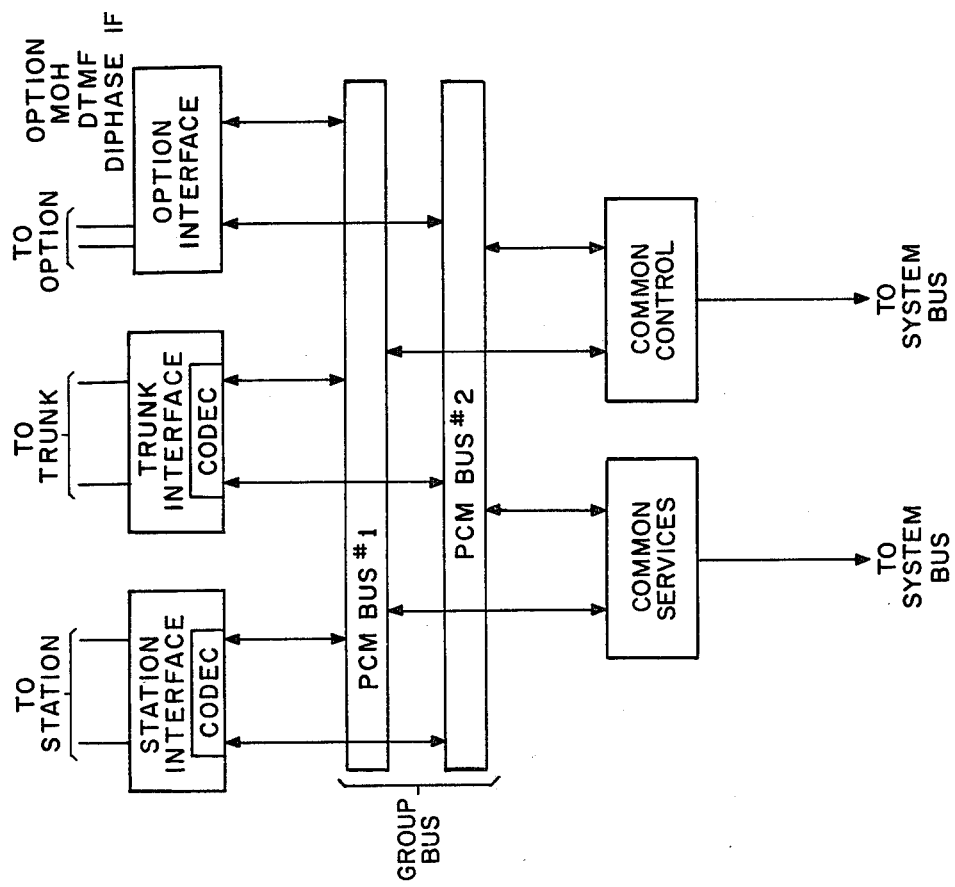
FIG. 2 is a schematic block diagram of the dual bus arrangement employed by our invention.

As shown in FIG. 2, the group bus is made up of two parallel thirty-two channel PCM busses. All stations, trunks and options have access to both busses as do all other circuits labelled as common services or common control. One bit of address data as determined by the processor designates which of the two PCM busses is indicated for use.

Figure 3:
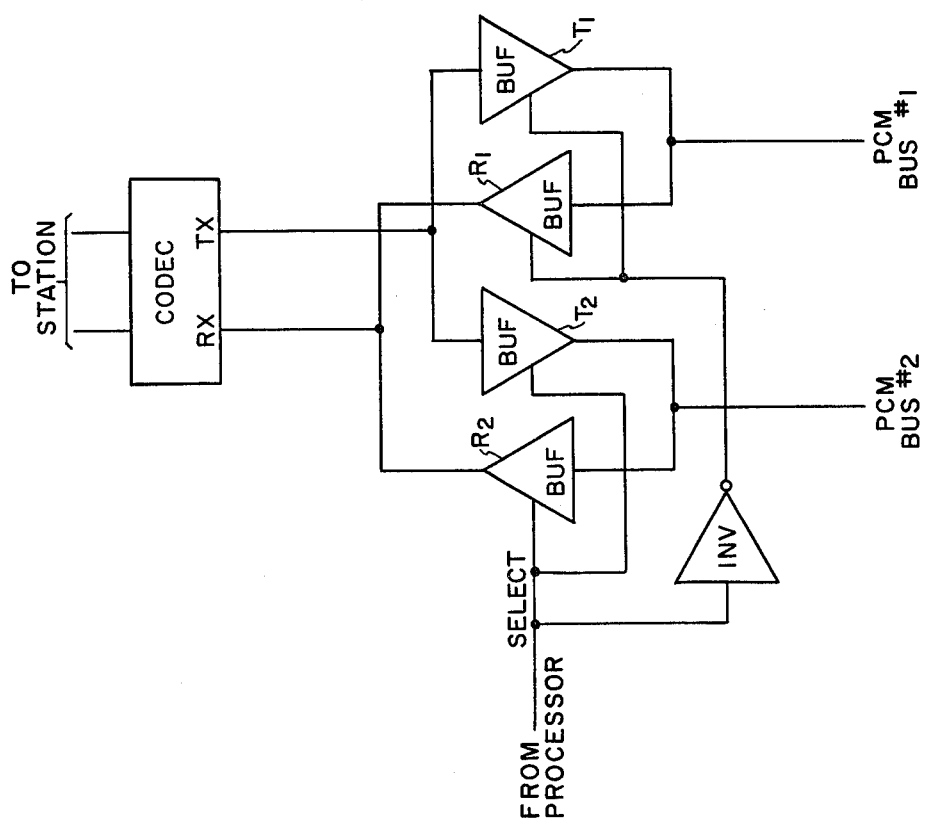
FIG. 3 is a generalized schematic diagram of the interface between the digital and analog data in the system of FIGS. 1 and 2.

In FIG. 3, we show the interfacing arrangement between the codec (station or trunk) and the two PCM busses which constitute the group bus. From the processor, a bus selet bit is fed through the address data buffers to enable the buffers for either PCM bus #1 or bus #2. One bit condition (high or low) will activate buffers R2 and T2 for data flow while the other bit condition through the inverter will enable the R1 and T1 buffers. As can be seen there are separate paths for receive and transmit and individual buffers for each direction of flow.

Figure 4:
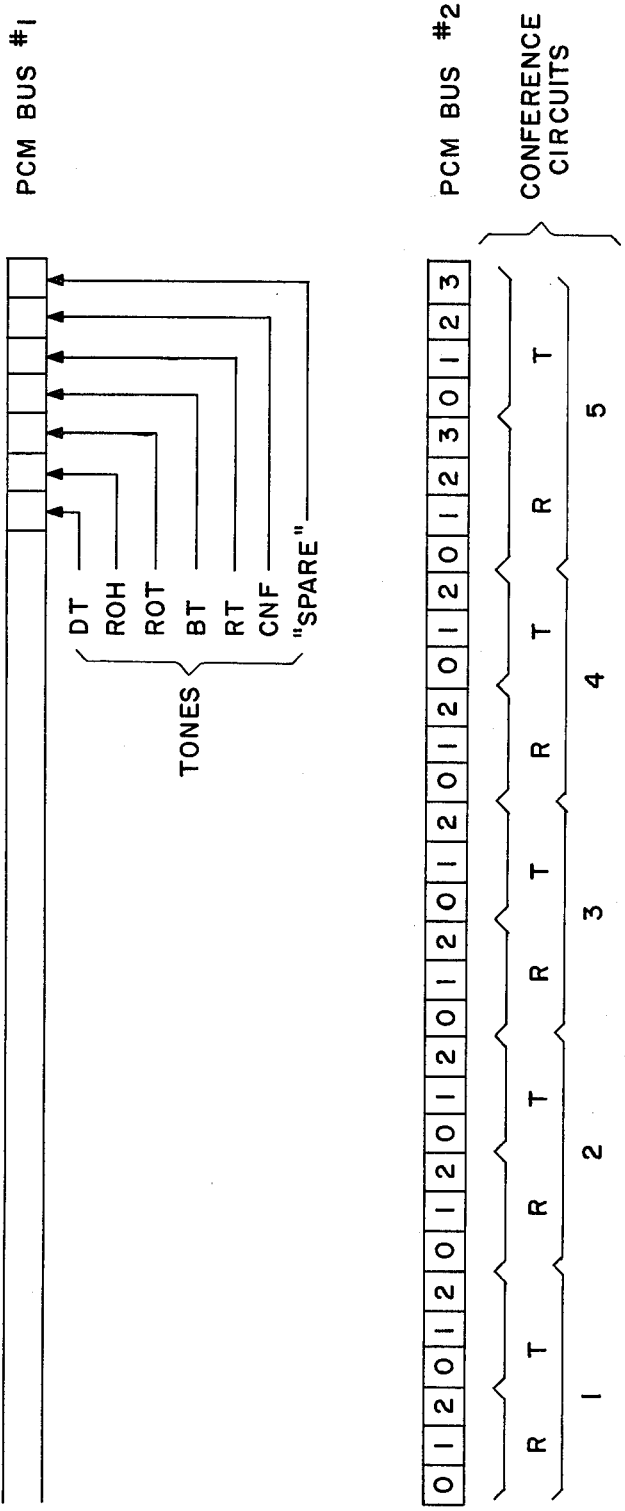
FIG. 4 is a timing chart showing the channel assignments for the system.

In FIG. 4, we show the channel allocations or assignments. Of the channels on bus #1, channels 0-24 are available for use in handling calls while channels 25-31 are allocated to specific call processing tones such as Dial Tone (DT), Receiver Off Hook (ROH), Re Order Tone (ROT), Busy Tone (BT), Ring Tone (RT), Confirmation Tone (CNF) and Camp-On Tone (COT). Each channel has eight time slots for an eight bit word in that channel.

FIG. 5 is a block diagram of a PCM Codec which performs the functions of coding speech in PCM format for transmission to the PCM bus and receives PCM data from the bus for conversion to analog speech signals. The codec which as mentioned may be the Intel 2910A has three sections, transmit, receive and control.

The codec through its control section also may perform the time slot assignment function through data received on the Dc lead as determined by clockings of the CLKc or channel clocking input lead. The control word on the Dc lead is an eight bit serial word, the first two bits of which represent transmit or receive and the final six bits define the channel assignment. The codec stores and retains the control word until a new word is loaded. By the use of this codec, the need for separate time slot interchangers is eliminated.

On PCM bus #2, the channels are allocatable to conferencing with four three-party conferences and one four-party conference possible. The received data for a conference uses the first three channels while the transmitted data uses the final three channels of the six channels required for the three party conference. In a like manner, the final eight time channels of the #2 bus are usable for four party conferencing, four channels for receiving data and four channels for transmitting data.

As mentioned previously, all stations and trunks have access to both PCM busses as determined by the bus address digit received from the processor.

In FIG. 6, we show the arrangement of FIGS. 2 and 3 expanded to as many as eight parallel PCM busses. Each bus has twenty-four channels. In the approach shown, the lines are grouped with similar lines within one or more groups. Thus, for example, Group 1 may have all Central Office (C.O.) lines, Group 2 a mix of stations and lines, Groups 3–6 stations and Groups 7 and 8 services such as tones, etc. Each group has a bus permanently assigned to it. Each line has a transmit channel permanently associated with it at the codec for that line. Between the codec and the bus, there is provided a line driver, an octal one such as that sold under part number 74LS244 is usable. In this way, for the transmit direction each line has a direct association or coupling to a predetermined channel of a predetermined bus.

For the received direction, a PCM bus is assigned by the processor as indicated by enabling a desired one of the busses through the 1 of 8 selector. Thereafter an available channel is assigned to handle the received call.

If desired a 24×8 RAM may be used between the processor and 1 to 8 data selector, strobed one pulse per timeslot so that the processor can write an address in a new time slot without disrupting the PCM data flow.

What is claimed is:

1. A telecommunications system for providing communication between a plurality of ports having analog input and output capability over a plural channel multiple bus digital switching and control network, interface means for each port for bidirectionally coupling the port to channels of the digital network, each said interface including a coder-decoder for converting information in analog from its port for the digital network and converting information in digital form from the network to analog, each interface means comprising channel selection and storage apparatus for maintaining correspondence between channels for the transfer of information to and from its port, said channel selection and storage apparatus including means for selecting a bus of said multiple bus network for the receipt of information by said coder-decoder and for direct transfer of information from each port to a predetermined one of said busses.

2. A telecommunications system as claimed in claim 1, in which there is a microprocessor for directing the selection of channels through the use of multibit words as addresses for each channel and in which the processor transmits at least one bus selection bit as the start of a channel address.

3. A time division communication system for establishing time shared connections between pairs of lines of the system on request, said system including a plurality of time division parallel busses, each bus being time shared by a plurality of time channels individual to that bus, a codec individual to each line for converting analog information from the line to digital data for transmission to a channel and for converting digital data from a channel to analog information for the line, each line having permanently associated therewith a channel of a predetermined bus for transmission of data therefrom, a processor for selecting an available channel of a selected one of said busses for temporary association with a line for the receipt of digital data whereby to complete said time shared connection, and in which certain of said channels of a bus are allocated to specific call processing tones.

4. A system as claimed in claim 3, in which one of said parallel busses is dedicated to port to port transmission while another bus is dedicated to conference calls.

5. A time division communication system for establishing time shared connections between system ports on request, in which there is a system bus for the bidirectional transfer of digital control data between a processor network, intermediate logic and function circuits, and in which there is a further bus for interfacing between said intermediate circuits and said ports, a codec for each of said ports for converting signals incoming from a port to digital signals for transmission to said further bus for timed shared communication thereover, said further bus comprising a plurality of parallel time shared busses with each of said parallel busses having a like plurality of time sharing channels, each of said ports having a receive path and a transmit path to and from its respective codec, each port having permanently associated with its transmit path a prescribed channel of a predetermined bus, and each port having an association with a selected channel of a selected one of said parallel busses on request from the processor of said network whereby to place ports in digital time shared communication over said parallel busses.

6. A time division system as claimed in claim 5, in which certain of the channels of one bus are in permanent association with tone circuits within said function and logic circuits for transmitting tones in digital form over said bus to selected ports.

* * * * *